(12) United States Patent
Boh et al.

(10) Patent No.: US 11,144,574 B2
(45) Date of Patent: Oct. 12, 2021

(54) SYSTEM AND METHOD FOR MANAGING DATABASE

(71) Applicant: International Business Machines Corporation, Armonk, NY (US)

(72) Inventors: Ritsuko Boh, Chiba (JP); Noriaki Kohno, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 14/938,299

(22) Filed: Nov. 11, 2015

(65) Prior Publication Data

US 2016/0154871 A1 Jun. 2, 2016

(30) Foreign Application Priority Data

Nov. 27, 2014 (JP) .............................. JP2014-240576

(51) Int. Cl.
*G06F 16/27* (2019.01)

(52) U.S. Cl.
CPC .................................. *G06F 16/273* (2019.01)

(58) Field of Classification Search
CPC .......................... G06F 17/30578; G06F 16/273
USPC ........................................................ 707/613
See application file for complete search history.

(56) References Cited

U.S. PATENT DOCUMENTS

| 9,122,606 B2* | 9/2015 | Sundrani ............. G06F 12/0804 |
| 2003/0051101 A1* | 3/2003 | Burger ................ G06F 12/0862 711/137 |

| 2007/0185922 A1* | 8/2007 | Kapoor ............... G06F 11/1469 |
| 2011/0093440 A1* | 4/2011 | Asakura .............. G06F 11/1471 707/685 |
| 2013/0007231 A1* | 1/2013 | Forssell ............... H04L 41/082 709/221 |

(Continued)

FOREIGN PATENT DOCUMENTS

| JP | 2006048103 A | 2/2006 |
| JP | 2011086241 A | 4/2011 |

(Continued)

OTHER PUBLICATIONS

IBM, "Time Travel Query Using Temporal Tables," 2014, 2 pages, Retrieved from Internet <URL: http://www-01.ibm.com/support/knowledgecenter/api/content/ . . . , DB2 10.5 for Linux, UNIX, and Windows.

(Continued)

*Primary Examiner* — Allen S Lin
(74) *Attorney, Agent, or Firm* — Aaron N. Pontikos

(57) ABSTRACT

A temporal DB that stores data having been stored in a DB of a mainframe is provided in a DB dedicated device 20. During a DB update, when an application on a mainframe issues an update SQL, a DBMS updates the DB and stores an update log, and an update-log capturing unit periodically reads out the update log. In the DB dedicated device 20, an update-log applying unit updates the temporal DB based on the update log. During DB reference, when the application on the mainframe issues an inquiry SQL with inquiry target time attached, the DBMS transfers the inquiry SQL to the inquiry processing unit. In the DB dedicated device, the inquiry processing unit inquires the temporal DB about data for the inquiry target time and returns an inquiry result to the DBMS.

20 Claims, 9 Drawing Sheets

(56) References Cited

U.S. PATENT DOCUMENTS

| | | | | |
|---|---|---|---|---|
| 2013/0036115 | A1* | 2/2013 | Schwarz | G06F 16/219 707/736 |
| 2013/0086092 | A1* | 4/2013 | James | G06F 17/30551 707/758 |
| 2014/0156595 | A1* | 6/2014 | Rose | G06F 17/30575 707/625 |
| 2016/0085801 | A1* | 3/2016 | Hellbusch | G06F 16/2365 707/737 |
| 2016/0170845 | A1* | 6/2016 | Nagae | G06F 17/30575 707/682 |

FOREIGN PATENT DOCUMENTS

| | | | |
|---|---|---|---|
| JP | 2011086246 | A | 4/2011 |
| JP | 6508648 | B2 | 5/2019 |

OTHER PUBLICATIONS

IBM, "Temporal Tables," 2014, 1 page, Retrieved on Oct. 9, 2014], Internet <URL: http://www-01.ibm.com/support/knowledgecenter/SSEPEX_10.0.0/com.ibm.db2z10.doc.admin/src/tpc/db2z_temporaltables.dita?lang=ja>.

Japan Terada Co., Ltd., "Teradata Database New Function," 2014, 4 pages, Retrieved from Internet: http://jpn.teradata.jp/library/column/col_09b.html.

Jensen, Christian S. et al.; "Incremental Implementation Model for Relational Databases with Transaction Time"; IEEE Transactions on Knowledge and Data Engineering; vol. 3; No. 4; Dec. 1991; Copyright 1991 IEEE; pp. 461-473.

English Translation of Office Action dated Jun. 5, 2018 for Japanese Patent Application No. 2014-240576; pp. 3.

* cited by examiner

Figure 3 (a)

| INSURANCE CONTRACT ID | COVERAGE | PERIOD START TIME | PERIOD END TIME |
|---|---|---|---|
| A123 | 12000 | 2010-12-08-11.19.39 | 9999-12-31-24.00.00 |

Figure 3 (b)

| INSURANCE CONTRACT ID | COVERAGE | PERIOD START TIME | PERIOD END TIME |
|---|---|---|---|
| A123 | 15000 | 2010-12-08-13.04.07 | 9999-12-31-24.00.00 |
| A123 | 12000 | 2010-12-08-11.19.39 | 2010-12-08-13.04.07 |

Figure 3 (c)

| INSURANCE CONTRACT ID | COVERAGE | PERIOD START TIME | PERIOD END TIME |
|---|---|---|---|
| A123 | 15000 | 2010-12-08-13.04.07 | 2010-12-08-15.04.11 |
| A123 | 12000 | 2010-12-08-11.19.39 | 2010-12-08-13.04.07 |

SYSTEM AND METHOD FOR MANAGING DATABASE

TECHNICAL FIELD

The present invention relates to a system and a method for managing a database.

BACKGROUND ART

In performing job processing using a database, there are a lot of requirements for referring to consistent data (data with a quiesce point) recorded in the database at specific points in time in the past. For example, when batch processing is performed for an entire transaction performed up to predetermined time in a system operating 24 hours and 365 days or when a relation between sales and a discount rate or point setting is analyzed in a system that treats commodities, transaction conditions of which fluctuates, data consistency at a point-in-time is required.

For such requirements, a method of creating a database consistent for specific points in time has been adopted (see, for example, Patent Literature 1, JP2011-86241A, which is hereby incorporated by reference).

Patent Literature 1 discloses a technique in which, in a DBMS, an original-table updating function updates, in response to a request of an application program, an original table and a recovery start point to be associated with the original table, an update-log recording function records an update log for the original table, a backup function outputs content of the original table to a backup file at predetermined timing and copies the recovery start point incidental to the original table to a recovery start point incidental to be associated with the backup file, and, thereafter, when a quiesce point and the original table are designated by a user, a duplicate generating function updates the backup file of the designated original table in a part of the update log from the recovery start point to be associated with the backup file to the quiesce point to thereby generate a target table, which is a duplicate of the original table at the quiesce point.

This method of creating the quiesce point of database is an effective method. However, the method is unsuitable as a method for using quiesce point data at any point in time.

As another method for the need for referring to the quiesce point data, a method of using a temporal database is examined (see, for example, Non Patent Literature 1, "Temporal Table", [online], IBM Japan, Ltd., [Retrieved on Oct. 9, 2014], Internet <URL: http://www.01.ibm.com/support/knowledgecenter/SSEPEX_10.0.0/com.ibm.db2z10.doc.admin/src/tpc/db2z_temporaltables.dita?lang=ja>). The temporal database is a database in which present and past data are stored together with terms of validity. By using the temporal database, it is possible to refer to data at any point in time by designating the time.

A first problem is that a load of updating the database increases. This is because a single UPDATE command has two processes internally as an update process of the present data and an insert process for the past data.

SUMMARY

It is an object of the present invention to reduce a load of storing history data in a temporal table.

It is another object of the present invention to reduce a load of referring to data stored in the database at any point in time.

To achieve these and other objects, the present invention provides a system that manages a database. The system includes a first device and a second device. The first device includes a first database that stores data for each of a plurality of records and a first updating unit that updates, in response to an update request for one record, data stored in the first database for the one record. The second device includes a second database that stores data having been stored in the first database for each of the plurality of records and a second updating unit that updates the second database asynchronously with the update of the data stored in the first database for the one record to cause the second database to store, for the one record, data stored in the first database before the update for the one record.

The second database may store the data having been stored in the first database in association with a period when the data is stored in the first database.

Moreover, the first device may further include a transfer unit that transfers, in response to a retrieval request for data stored in the first database for the one record at a designated point in time, the retrieval request to the second device. The second device may further include a retrieving unit that retrieves, in response to the transfer of the retrieval request, data stored in the second database for the one record in association with a period including the designated point in time.

Moreover, the retrieving unit may retrieve, after all updates of the first database performed before the designated point in time are reflected onto the second database, data stored in the second database for the one record in association with the period including the designated point in time.

Moreover, the retrieving unit may retrieve, if a point in time when it is checked last whether the first database is updated is later than the designated point in time, data stored in the second database for the one record in association with the period including the designated point in time.

Moreover, the transfer unit may transfer, if retrieval of data stored in the first database for the one record at a present point in time is requested, the retrieval request for the data with the present point in time as the designated point in time to the second device.

Further, the second device may be a device capable of retrieving data stored in the second database faster than the first device retrieving data stored in the first database.

The present invention provides a system that manages a database. The system includes a first device and a second device capable of retrieving data stored in a database faster than the first device. The first device includes a first database that stores data for each of a plurality of records and a transfer unit that transfers, in response to a retrieval request for data stored in the first database at a designated point in time for one record, the retrieval request to the second device. The second device includes a second database that stores data having been stored in the first database in association with a period when the data is stored in the first database for each of the plurality of records and a retrieving unit that retrieves, in response to the transfer of the retrieval request, data stored in the second database in association with a period including the designated point in time for the one record.

Further, the present invention relates to a method of managing a database in a system. The system includes a first device including a first database that stores data for each of a plurality of records and a second device including a second database that stores data having been stored in the first database for each of the plurality of records. The method includes the first device updating, in response to an update request for one record, data stored in the first database for the one record, and the second device updating the second database asynchronously with the update of the data stored in the first database for the one record to cause the second database to store, for the one record, data stored in the first database before the update for the one record.

The second device may be a device capable of retrieving data stored in the second database faster than the first device retrieving data stored in the first database. In that case, the second database may store the data having been stored in the first database in association with a period when the data is stored in the first database. The first device may transfer, in response to a retrieval request for data stored in the first database for the one record at a designated point in time, the retrieval request to the second device. The second device may retrieve, in response to the transfer of the retrieval request, data stored in the second database for the one record in association with a period including the designated point in time.

According to the present invention, a load of performing an update of a database that enables reference to data having been stored in the database is reduced.

BRIEF DESCRIPTION OF DRAWINGS

FIGS. 3(a) to 3(c) are diagrams showing transition of content during an update of a temporal DB;

DETAILED DESCRIPTION

An embodiment of the present invention is explained in detail below with reference to the accompanying drawings.

Overview of this Embodiment

In this embodiment, a database (hereinafter referred to as "DB"), in which data with a quiesce point is desired to be referred to, is stored in a mainframe as a normal DB and stored in a DB dedicated device as a temporal DB. During an update of the DB, the DB on the mainframe is updated, the update is captured, and the temporal DB of the DB dedicated device is updated. When it is desired to refer to specific quiesce point data, an SQL with inquiry target time designated is issued to a DBMS of the mainframe. Then, the DBMS of the mainframe requests the DB dedicated device to perform SQL processing. Consequently, the DB dedicated device inquires the temporal DB about data for the inquiry target time and returns an inquiry result to the mainframe. If update reflected time, which is update time on the mainframe of an update reflected onto the DB dedicated device side, does not catch up with the inquiry target time, the DB dedicated device waits and then inquires about the data after the update reflected time catches up with the inquiry target time.

As an option, a mechanism of this embodiment may be used in order to refer to the present data. In this case, the DBMS adds time when the SQL is issued to the SQL as inquiry target time and requests the DB dedicated device to perform the SQL processing.

Functional Configuration of a DB System in this Embodiment

Figure 1:
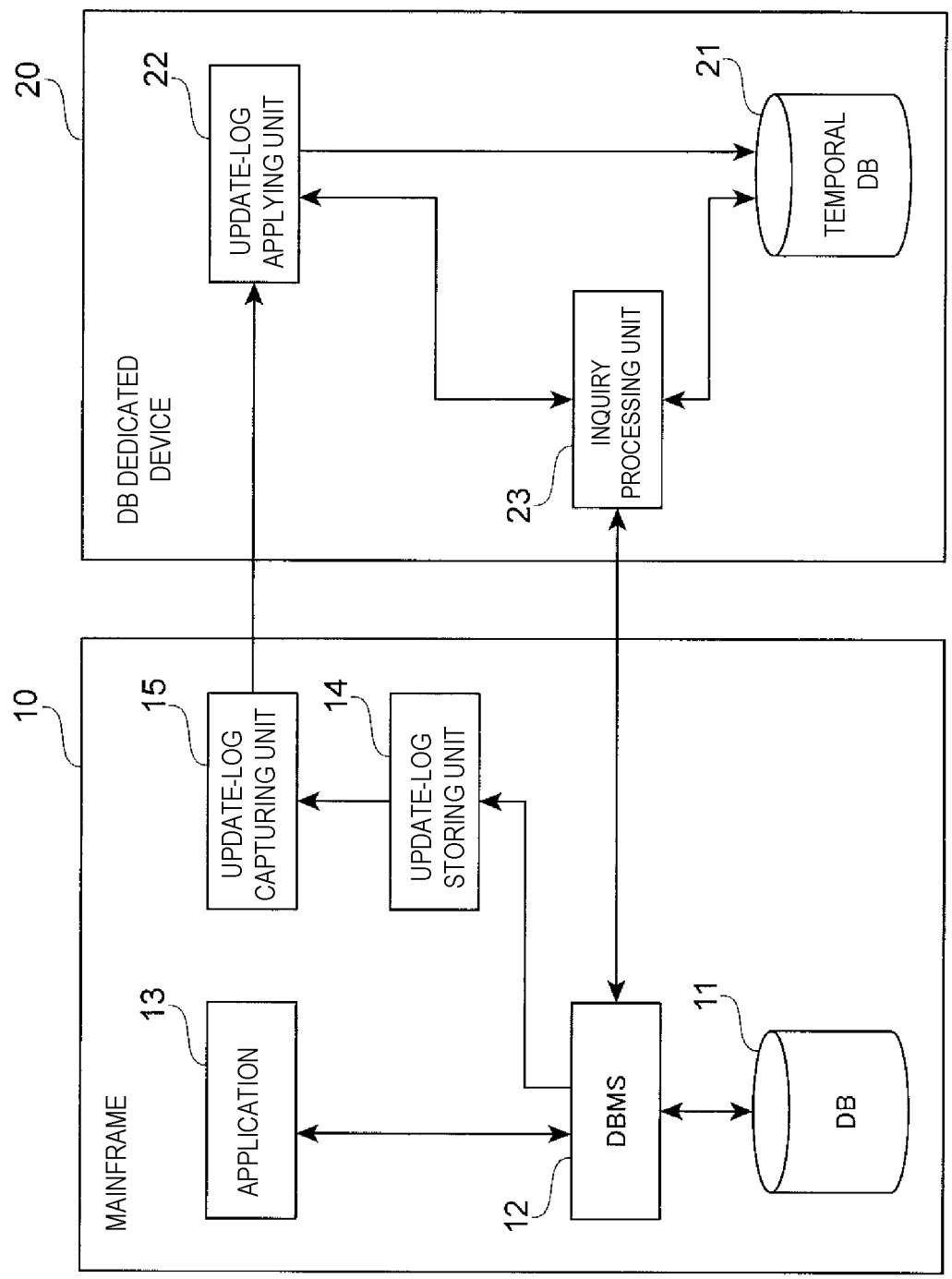
FIG. 1 is a diagram showing a functional configuration example of a DB system in an embodiment of the present invention.

FIG. 1 is a diagram showing a functional configuration example of a DB system for realizing such a schematic operation. As shown in the figure, the DB system includes a mainframe 10 and a DB dedicated device 20. The mainframe 10 is an example of a first device and is a general purpose computer device that executes job processing. The mainframe 10 includes a DB 11, a DBMS 12, an application 13, an update-log storing unit 14, and an update-log capturing unit 15. The DB dedicated device 20 is an example of a second device and is a device capable of retrieving data at high speed using a plurality of processors. The DB dedicated device 20 includes a temporal DB 21, an update-log applying unit 22, and an inquiry processing unit 23. The mainframe 10 and the DB dedicated device 20 are connected by communication means (not shown in the figure).

First, components of the mainframe 10 are explained.

The DB 11 is a normal DB used in job processing. The term "normal DB" is used to mean a DB in which, when data is updated for each record, the data before the update is replaced with the data after the update and latest data is always stored. In this embodiment, the DB 11 is provided as an example of a first database that stores data for each of a plurality of records.

The DBMS 12 is a program for executing various kinds of processing for managing the DB 11. The DBMS 12 includes a mechanism for allocating an SQL issued by the application 13. Specifically, the DBMS 12 updates the DB 11 based on an update SQL for an update for a DB and refers to the DB 11 based on an inquiry SQL for an inquiry to the DB that does not designate inquiry target time. On the other hand, the DBMS 12 transfers an inquiry SQL for the inquiry to the DB that designates the inquiry target time to the inquiry processing unit 23. In this embodiment, the DBMS 12 is provided as an example of a first update unit that updates data stored in a first database for one record and as an example of a transfer unit that transfers a retrieval request for data stored in the first database at a designated point in time for the one record to the second device.

The application 13 is a program for executing job processing using the DB 11. For the execution of the job processing, the application 13 issues an update SQL or an inquiry SQL.

When an update for the DB 11 is performed, the update-log storing unit 14 stores an update log including an update type, which is a type of the update, an update time stamp indicating time when the update is performed, and update content, which is content of the update.

The update-log capturing unit 15 periodically reads the update log stored in the update-log storing unit 14 and transmits the update type, the update time stamp, and the update content to the update-log applying unit 22. Note that, if the update log is not stored after the last reading, the update-log capturing unit 15 transmits reading execution time when the reading of the update log is executed to the update-log applying unit 22. In this embodiment, the reading execution time is used as an example of a point in time when it is checked last whether the first database is updated.

Components of the DB dedicated device 20 are explained.

The temporal DB 21 is a DB that stores present and past data of the DB 11 together with terms of validity. In the following explanation, the temporal DB 21 is explained as including one table that stores present and past data together with terms of validity. However, the temporal DB 21 may include a temporal table that stores present data together with a term of validity and a history table that stores past data together with a term of validity. In the following explanation, the terms of validity are explained as being stored in the temporal DB 21. However, the terms of validity do not always have to be stored in the temporal DB 21 as long as the terms of validity are associated with present and past data in some form. In this embodiment, the temporal DB 21 is provided as an example of a second database that stores data having been stored in the first database for each of a plurality of records.

The update-log applying unit 22 updates the temporal DB 21 based on information sent from the update-log capturing unit 15. In updating the temporal DB 21, if the update type is INSERT, the update-log applying unit 22 inserts data and records an update time stamp as a start point of a term of validity for the data. If the update type is UPDATE, the update-log applying unit 22 copies target data, records an update time stamp as an end point of a term of validity for the copied data, and, thereafter, updates the target data and records the same update time stamp at a start point of a term of validity for the updated data. If the update type is DELETE, the update-log applying unit 22 records an update time stamp as an end point of a term of validity of the target data. In this embodiment, the update-log applying unit 22 is provided as an example of a second updating unit that updates the second database to cause the second database to store, for one record, data stored in the first database before update for the one record. The DBMS 12 stores an update log when the DB 11 is updated. The update-log applying unit 22 updates the temporal DB 21 based on the update log periodically read out by the update-log capturing unit 15. Therefore, the update-log applying unit 22 can be grasped as updating the temporal DB 21 asynchronously with the update of the DB 11. That is, the update-log applying unit 22 is also an example of a second updating unit that updates the second database asynchronously with the update of the data stored in the first database for the one record.

The inquiry processing unit 23 extracts, from the temporal DB 21, based on the inquiry SQL sent from the DBMS 12, data that is valid at designated inquiry target time. In this embodiment, the inquiry target time is used as an example of a designated point in time. The inquiry processing unit 23 is provided as an example of a retrieving unit that retrieves data stored in the second database in association with a period including the designated point in time for one record.

Overall Operation of the DB System in this Embodiment

1. Operation During a DB Update

Figure 2:
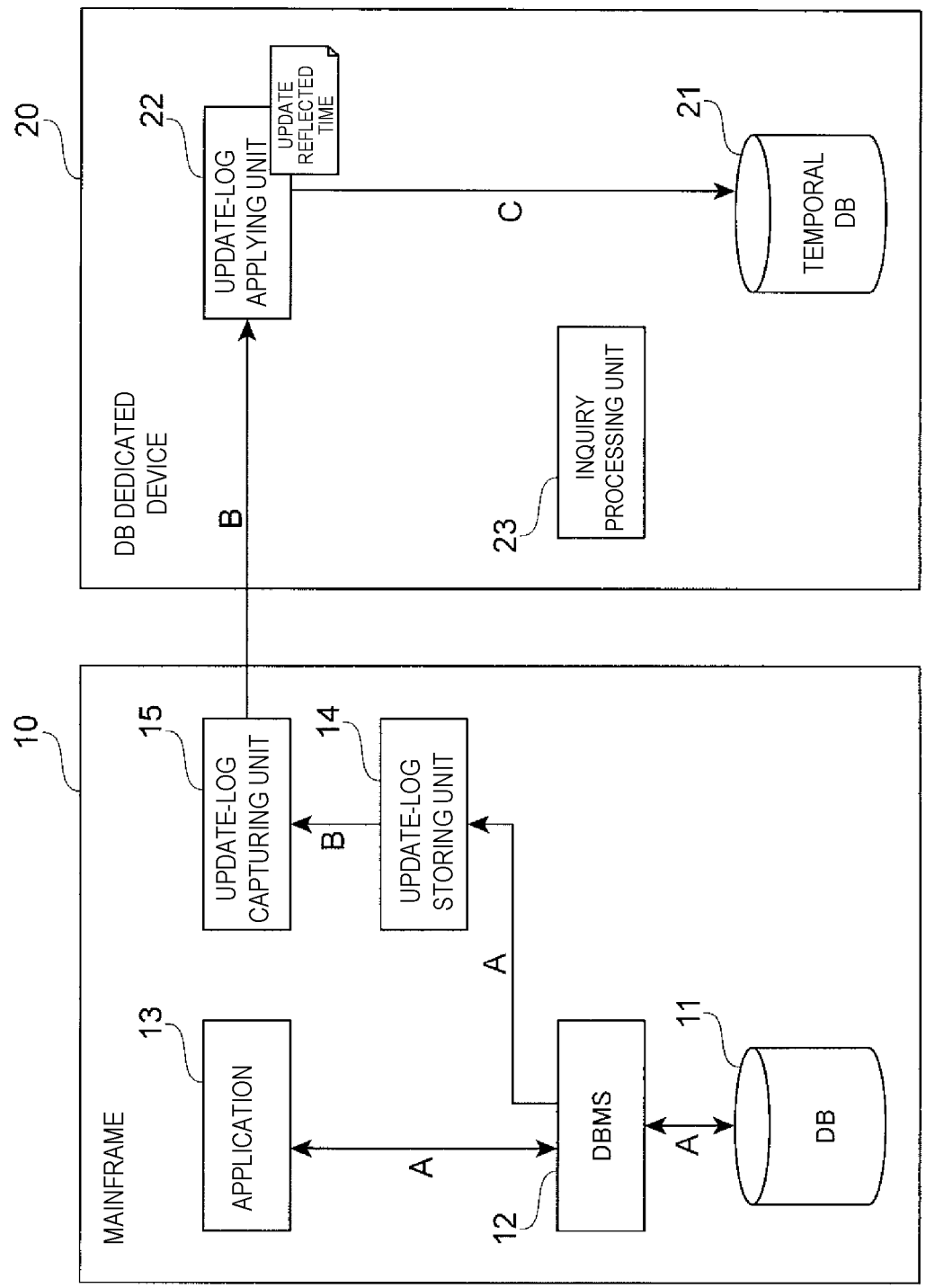
FIG. 2 is a diagram for explaining an operation example during a DB update of a the DB system in the embodiment of the present invention.

FIG. 2 is a diagram for explaining an operation example during a DB update of the DB system in this embodiment.

As shown in the figure, first, the application 13 issues an update SQL. The DBMS 12 updates the DB 11 in response to the update SQL and writes an update log including update content in the update-log storing unit 14 (step A).

Subsequently, the update-log capturing unit 15 reads the update log from the update-log storing unit 14 and transmits the update log including the update content to the update-log applying unit 22 (step B).

Subsequently, the update-log applying unit 22 updates the temporal DB 21 based on the update content and the like transmitted from the update-log capturing unit 15 (step C). When updating the temporal DB 21, the update-log applying unit 22 stores, as update reflected time, an update time stamp recorded in the update log by the DBMS 12.

Transition of content during the update of the temporal DB 21 is explained. FIGS. 3(a) to 3(c) are diagrams showing the transition of content. In the figures, a DB that stores information on compensation of insurance is assumed as an example of the DB 11. Therefore, the temporal DB 21 includes an "insurance contract ID" row and a "coverage" row. These rows are rows included in the DB 11. The temporal DB 21 also includes a "period start time" row and a "period end time" row in order to manage an update history of data. These rows are rows not included in the DB 11 and added anew in the temporal DB 21. Note that, in the figures, only records with "A123" as "insurance contract ID" row are extracted and shown.

FIG. 3(a) is a diagram showing content of the temporal DB 21 at the time when an INSERT command is executed on the DB 11 for a record, the "insurance contract ID" row of which is "A123" and the "coverage" row of which is "12000". As shown in the figure, this record is inserted into the temporal DB 21. When the record is inserted, an update time stamp recorded during the execution of the INSERT command is written in the "period start time" row. In this example, "2010-12-08-11.19.39" is written. At this point in time, a value is not recorded in the "period end time" row. The "period end time" row has a maximum value.

FIG. 3(b) is a diagram showing content of the temporal DB 21 at the time when an UPDATE command for changing "12000" of the "coverage" row to "15000" is executed on the DB 11 for a record, the "insurance contract ID" row of which is "A123". As shown in the figure, in the temporal DB 21, first, an entire record before update is stored as past data. When the record is stored, an update time stamp recorded during the execution of the UPDATE command is written in the "period end time" row. In this example, "2010-12-08-13.04.07" is written. In the temporal DB 21, the same update time stamp is written in the "period start time" row of the updated record.

FIG. 3(c) is a diagram showing content of the temporal DB 21 at the time when a DELETE command is executed on the DB 11 for a record, the "insurance contract ID" row of which is "A123", in a state in which the "coverage" row is "15000". As shown in the figure, in the temporal DB 21, first, an entire record before update is stored as past data. When the record is stored, an update time stamp recorded during the execution of the DELETE command is written in the "period end time" row. In this example, "2010-12-08-15.04.11" is written.

2. Operation During DB Reference

Figure 4:
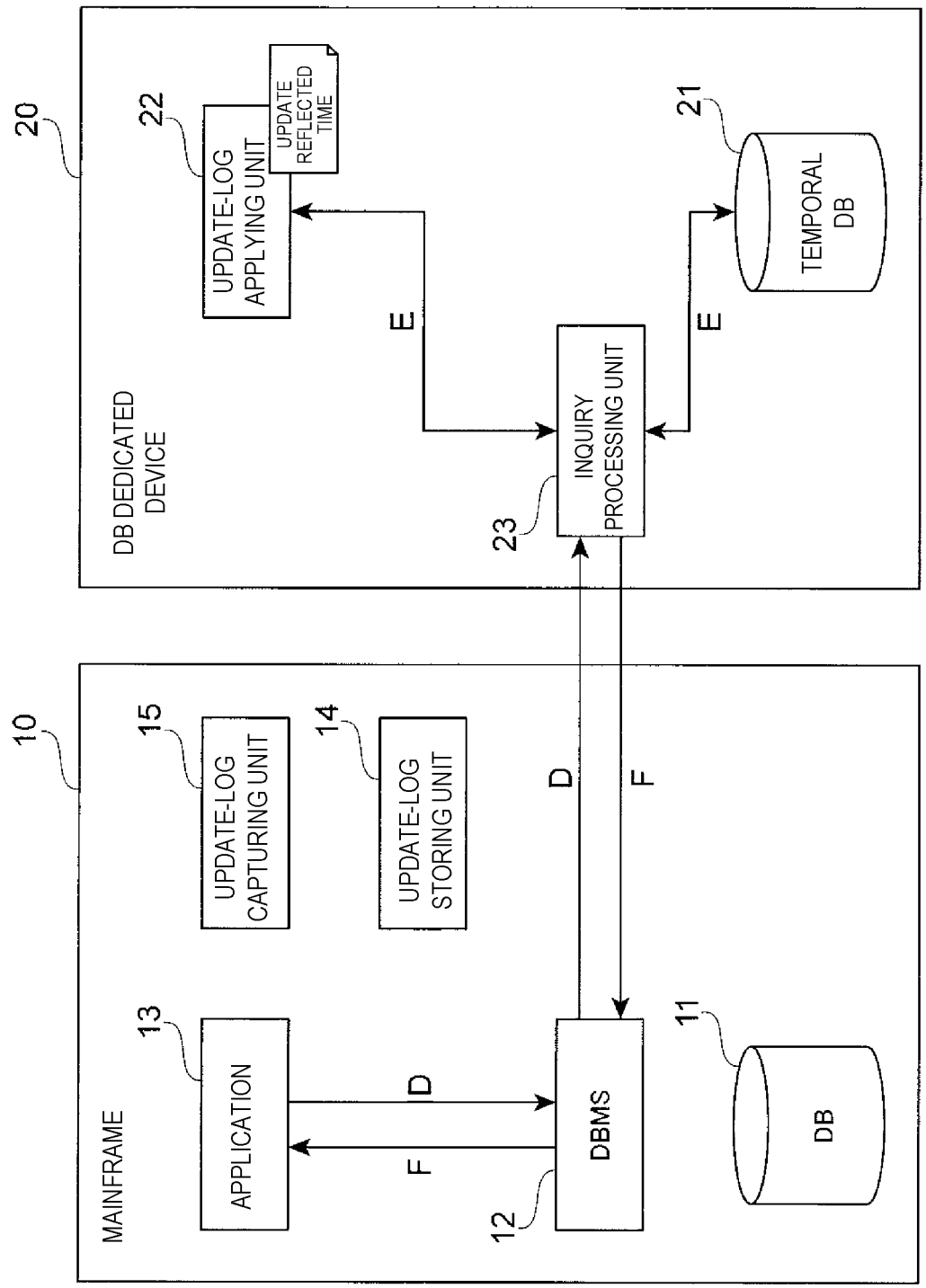
FIG. 4 is a diagram for explaining an operation example during DB reference of the DB system in the embodiment of the present invention.

FIG. 4 is a diagram for explaining an operation example during DB reference of the DB system in this embodiment.

As shown in the figure, first, the application 13 issues an inquiry SQL designating inquiry target time. The DBMS 12 requests the inquiry processing unit 23 of the DB dedicated device 20 to inquire about data (step D).

Subsequently, the inquiry processing unit 23 inquires the temporal DB 21 about data at the inquiry target time (step E). When inquiring about the data, the inquiry processing unit 23 confirms with the update-log applying unit 22 that update reflected time is later than the inquiry target time. If the update reflected time is not later than the inquiry target time, the inquiry processing unit 23 inquires about the data at the inquiry target time after the update reflected time becomes later than the inquiry target time. That is, for example, if there is an update not reflected on the temporal DB 21, the inquiry processing unit 23 inquires about the data after reflection of the update is completed.

Subsequently, the inquiry processing unit 23 returns a result of the inquiry to the application 13 through the DBMS 12 (step F). Specifically, in response to a SELECT command designating any inquiry target time, the inquiry processing unit 23 returns data that satisfies a condition that the inquiry target time is between time of the "period start time" row and time of the "period end time" row.

Operation of the Components of the DB System in this Embodiment

1. Operation of the DBMS

Figure 5:
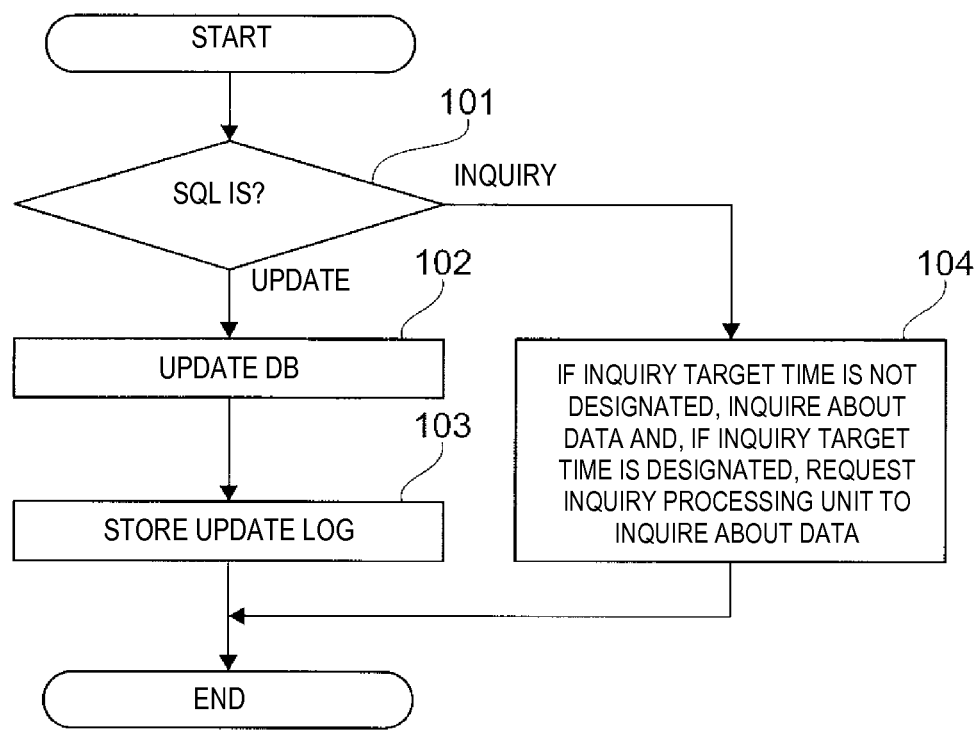
FIG. 5 is a flowchart showing an operation example of a DBMS configuring a mainframe.

FIG. 5 is a flowchart showing an operation example of the DBMS 12 configuring the mainframe 10. Note that the DBMS 12 starts operation by receiving an SQL issued by the application 13.

After starting the operation, first, the DBMS 12 determines whether the SQL received from the application 13 is an update SQL or an inquiry SQL (step 101).

As a result, if determining that the SQL received from the application 13 is the update SQL, the DBMS 12 updates the DB 11 based on the update SQL (step 102). The DBMS 12 stores an update log including an update type, an update time stamp, and update content in the update-log storing unit 14 (step 103).

On the other hand, if determining that the SQL received from the application 13 is the inquiry SQL, when inquiry target time is not designated, the DBMS 12 inquires the DB 11 about data based on the inquiry SQL. When the inquiry target time is designated, the DBMS 12 transfers the inquiry SQL to the inquiry processing unit 23 of the DB dedicated device 20 to thereby request inquiry about data (step 104).

2. Operation of the Update-Log Capturing Unit

Figure 6:
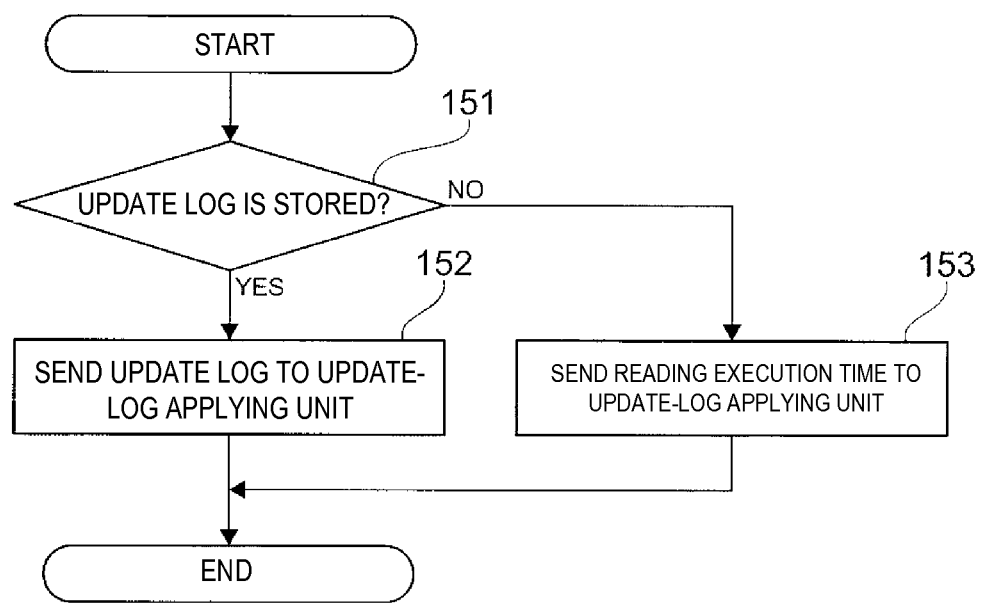
FIG. 6 is a flowchart showing an operation example of an update-log capturing unit configuring the mainframe.

FIG. 6 is a flowchart showing an operation example of the update-log capturing unit 15 configuring the mainframe 10. Note that the update-log capturing unit 15 operates at a fixed time interval.

After starting the operation, first, the update-log capturing unit 15 determines whether an update log is stored in the update-log storing unit 14 after the last reading (step 151).

As a result, if determining that an update log is stored after the last reading, the update-log capturing unit 15 transmits the update log to the update-log applying unit 22 (step 152). Note that the update log includes an update type, an update time stamp, and update content as explained above.

On the other hand, if determining that an update log is not stored after the last reading, the update-log capturing unit 15 transmits reading execution time when reading of an update log is executed to the update-log applying unit 22 (step 153).

3. Operation of the Update-Log Applying Unit

Figure 7:
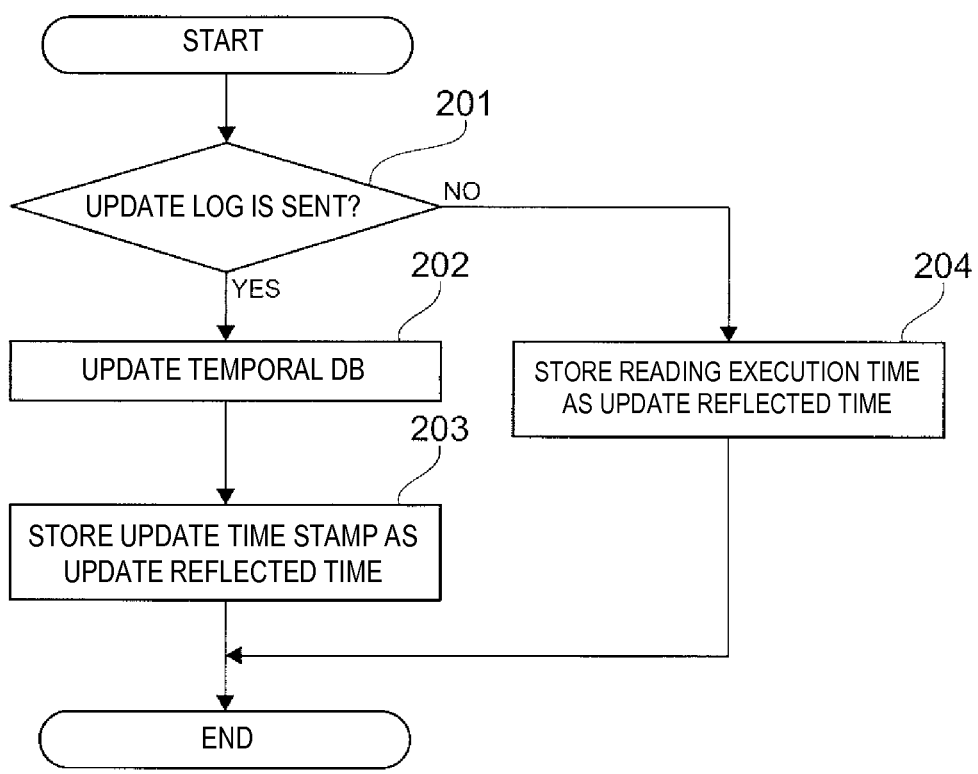
FIG. 7 is a flowchart showing an operation example of an update-log applying unit configuring a DB dedicated device.

FIG. 7 is a flowchart showing an operation example of the update-log applying unit 22 configuring the DB dedicated device 20. Note that the update-log applying unit 22 starts operation by receiving information transmitted by the update-log capturing unit 15.

After starting the operation, first, the update-log applying unit 22 determines whether the information transmitted by the update-log capturing unit 15 is an update log (step 201).

As a result, if determining that the information transmitted by the update-log capturing unit 15 is an update log, the update-log applying unit 22 updates the temporal DB 21 based on update content included in the update log (step 202). When updating the temporal DB 21, the update-log applying unit 22 updates the temporal DB 21 according to an update type included in the update log. Specifically, when the update type is INSERT, the update-log applying unit 22 adds a record to the temporal DB 21 and records an update time stamp of the update log to a "period start time" row of the record. When the update type is UPDATE, the update-log applying unit 22 copies a relevant record in the temporal DB 21 and records the update time stamp of the update log in a "period end time" row of the copied record. Thereafter, the update-log applying unit 22 updates the relevant record in the temporal DB 21 and records the update time stamp of the update log in the "period start time" row of the original record. When the update type is DELETE, the update-log applying unit 22 records the update time stamp of the update log in the "period end time" row of the relevant record in the temporal DB 21.

Thereafter, the update-log applying unit 22 stores, as update reflected time, the update time stamp included in the update log (step 203).

On the other hand, if determining that the information transmitted by the update-log capturing unit 15 is not an update log, that is, if determining that the information is reading execution time, the update-log applying unit 22 stores the reading execution time as the update reflected time (step 204).

4. Operation of the Inquiry Processing Unit

Figure 8:
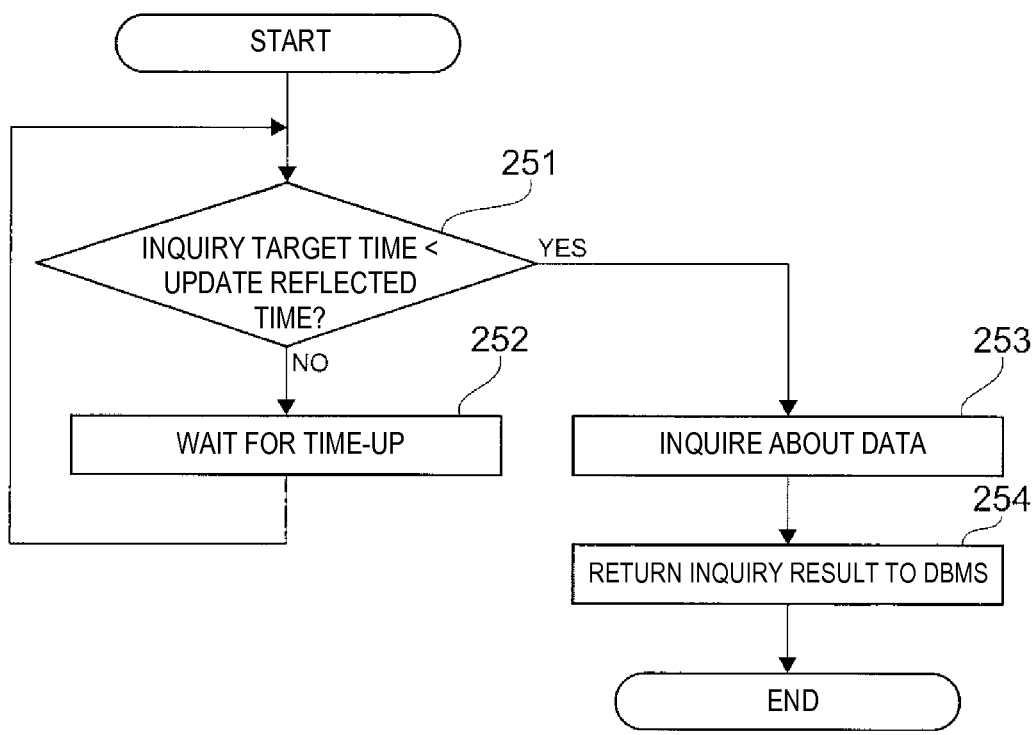
FIG. 8 is a flowchart showing an operation example of an inquiry processing unit configuring the DB dedicated device.

FIG. 8 is a flowchart showing an operation example of the inquiry processing unit 23 configuring the DB dedicated device 20. Note that the inquiry processing unit 23 starts operation by receiving an inquiry SQL transferred by the DBMS 12.

After starting the operation, first, the inquiry processing unit 23 determines whether a condition that update reflected time is later than inquiry target time is satisfied (step 251). This determination is determination for checking whether an update for data of the inquiry target time has been reflected on the temporal DB 21. As the update reflected time, update reflected time stored in the update-log applying unit 22 only has to be used. As the inquiry target time, inquiry target time added to the inquiry SQL and sent only has to be used.

As a result, if determining that the condition that the update reflected time is later than the inquiry target time is not satisfied, the inquiry processing unit 23 waits for the condition to be satisfied. That is, for example, the inquiry processing unit 23 waits for time-up of a timer (step 252). If time is up, the inquiry processing unit 23 determines again whether the condition is satisfied (step 251). If determining that the condition that the update reflected time is later than the inquiry target time is satisfied, the inquiry processing unit 23 inquires the temporal DB 21 about data of the inquiry target time (step 253). Thereafter, the inquiry processing unit 23 returns a result of the inquiry about the data to the DBMS 12 of the mainframe 10 (step 254). Consequently, the data inquiry result is returned to the application 13.

5. Optional Operation

A function of the DB dedicated device 20 for performing consistent inquiry when the application 13 issues an inquiry SQL without designating inquiry target time may be provided as an optional function. To realize this function, in FIG. 5, a step of adding issue time of an SQL to the inquiry SQL as the inquiry target time is desirably provided before step 104 performed when it is determined in step 101 that the SQL is the inquiry SQL.

Effects of this Embodiment

In this embodiment, the temporal DB 21 is included only on the DB dedicated device 20 side. Consequently, quiesce point data at any point in time can be referred to from the temporal DB 21 of the DB dedicated device 20. On the mainframe 10, only the DB 11, which is the normal DB, is updated. Therefore, only a normal update load is applied. Further, it is possible to, without locking the DB 11 on the mainframe 10, inquire about the quiesce point data in a state in which REPEATABLE READ is guaranteed.

In addition, in this embodiment, the DB dedicated device 20 is a device that is capable of performing reference to a DB at high speed. Consequently, since the quiesce point data is referred to on the DB dedicated device 20 at high speed, a load of inquiry processing is not applied to the mainframe 10.

Hardware Configuration of a Computer Applicable with this Embodiment

Figure 9:
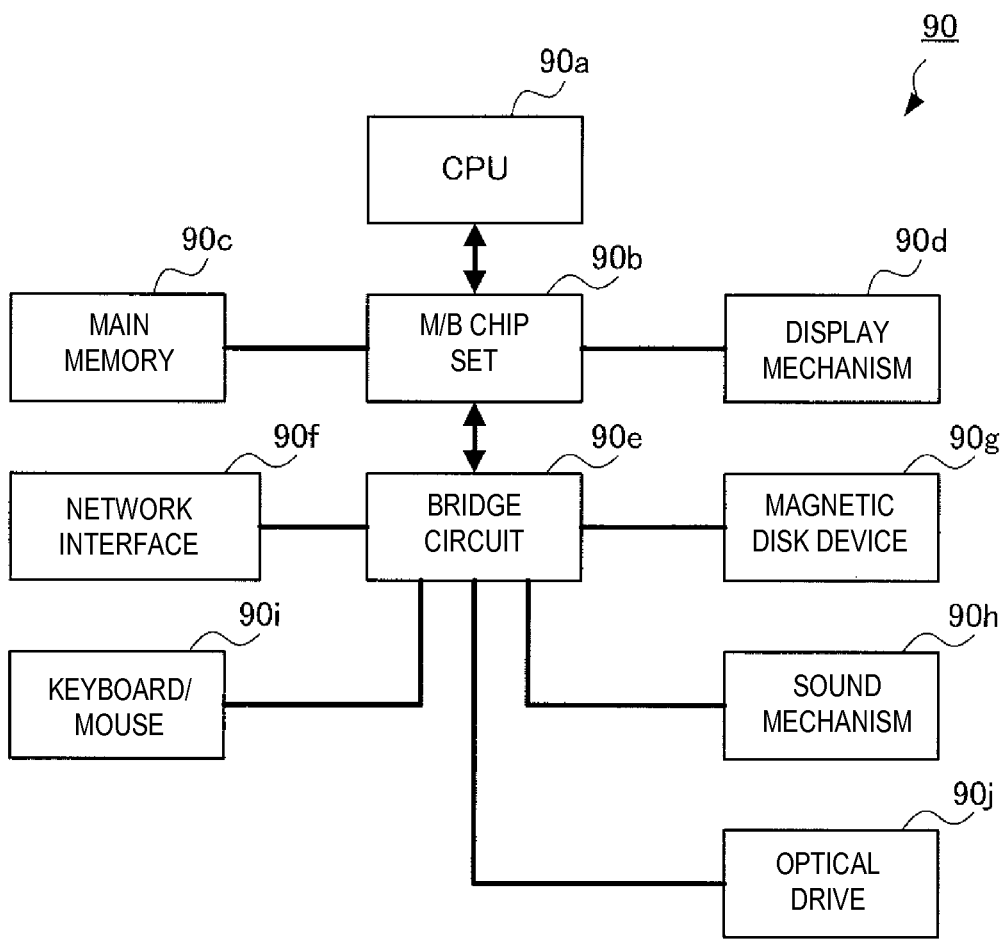
FIG. 9 is a diagram showing a hardware configuration example of a computer applicable with an embodiment of the present invention.

FIG. 9 is a diagram showing a hardware configuration example of a computer 90 applicable with this embodiment. As shown in the figure, the computer 90 includes a CPU (Central Processing Unit) 90a, which is arithmetic means, a main memory 90c connected to the CPU 90a via an M/B (motherboard) chip set 90b, and a display mechanism 90d also connected to the CPU 90a via the M/B chip set 90b. A network interface 90f, a magnetic disk device (a HDD) 90g, a sound mechanism 90h, a keyboard/mouse 90i, and an optical drive 90j are connected to the M/B chip set 90b via a bridge circuit 90e.

Note that, in FIG. 9, the components are connected via buses. For example, the CPU 90a and the M/B chip set 90b are connected and the M/B chip set 90b and the main memory 90c are connected via a CPU bus. The M/B chip set 90b and the display mechanism 90d may be connected via an AGP (Accelerated Graphics Port). However, when the display mechanism 90d includes a video card adapted to PCI Express, the M/B chip set 90b and the video card are connected via a PCI Express (PCIe) bus. When being connected to the bridge circuit 90e, for example, the PCI Express can be used for the network interface 90f. For the magnetic disk device 90g, for example, serial ATA (AT Attachment), ATA of parallel transfer, and PCI (Peripheral Components Interconnect) can be used. Further, for the keyboard/mouse 90i and the optical drive 90j, a USB (Universal Serial Bus) can be used.

The present invention may be entirely realized by hardware or may be entirely realized by software. The present invention can also be realized by both of the hardware and the software. The present invention can be realized as a computer, a data processing system, and a computer program. The computer program can be stored in a computer readable medium and provided. As the medium, an electronic, magnetic, optical, electromagnetic, infrared, or semiconductor system (device or apparatus) or a propagation medium is conceivable. As the computer readable medium, a semiconductor, a solid state storage device, a magnetic tape, a removable computer diskette, a random access memory (RAM), a read only memory (ROM), a rigid magnetic disk, and an optical disk are illustrated. Examples of the optical disk at the present point include a compact disk read only memory (CD-ROM), a compact disk read/write (CD-R/W), and a DVD.

The present invention is explained above with reference to the embodiment. However, the technical scope of the present invention is not limited to the embodiment. It is event for those skilled in the art that the present invention can be variously changed or alternative modes can be adopted without departing from the spirit and the scope of the present invention.

What is claimed is:

1. A computer system for managing data stored on a database, comprising:
   a first device having a first database that only stores current versions of records;
   a second device having a second database that stores copies of current and prior versions of records stored in the first database;
   one or more computer processors;
   one or more computer readable storage media;
   computer program instructions, the computer program instructions being stored on the one or more computer readable storage media for execution by the one or more computer processors, the computer program instructions comprising instructions to:
      update, at an update time, a record stored in the first database, wherein the update includes replacing a current version of the record with an updated version of the record; and
      asynchronously update a first copy of the current version of the record stored in the second database with the updated version of the record stored in the first database, wherein the instruction to asynchronously update the first copy of the current version of the record stored in the second database with the updated version of the record stored in the first database further comprises instructions to:
         generate a second copy from the first copy of the current version of the record stored in the second database to be stored in the second database, prior to updating the first copy of the current version of the record stored in the second database with the updated version of the record stored in the first database;
         update, in response to generating the second copy from the first copy of the current version of the record stored in the second database, the first copy of the current version of the record stored in the second database with the updated version of the record stored in the first database;
         change an end time period of validity for the second copy of the current version of the record stored in the second database to the update time of the updated version of the record stored in the first database; and
         assign a start time period of validity for the updated version of the first copy of the record stored in the second database equal to the update time of the updated version of the record stored in the first database.

2. The computer system according to claim 1, wherein the period of validity reflects a period of time when a particular version of the record was valid.

3. The computer system according to claim 1, further comprising instructions to:

transfer, in response to a retrieval request for data stored in the first database for the record in association with a designated point in time, the retrieval request to the second device.

4. The computer system according to claim 3, wherein the retrieval request for data stored in the first database for the record in association with the designated point in time is transferred to the second device after any updates of the record stored in the first database performed before the designated point in time are reflected onto the second database.

5. The computer system according to claim 1, further comprising instructions to:
transfer, in response to a retrieval request for data stored in the first database for the record at a present point in time, the retrieval request for the data with the present point in time to the second device.

6. The computer system according to claim 1, wherein the second device is a device capable of retrieving data stored in the second database faster than the first device retrieving data stored in the first database.

7. A computer program product for managing data stored on a first device having a first database that only stores current versions of records and a second device having a second database that stores copies of current and prior versions of records stored in the first database, comprising:
one or more non-transitory computer readable storage media and program instructions stored on the one or more non-transitory computer readable storage media the computer program instructions comprising instructions to:
update, at an update time, a record stored in the first database, wherein the update includes replacing a current version of the record with an updated version of the record; and
asynchronously update a first copy of the current version of the record stored in the second database with the updated version of the record stored in the first database, wherein the instruction to asynchronously update the first copy of the current version of the record stored in the second database with the updated version of the record stored in the first database further comprises instructions to:
generate a second copy from the first copy of the current version of the record stored in the second database to be stored in the second database, prior to updating the first copy of the current version of the record stored in the second database with the updated version of the record stored in the first database;
update, in response to generating the second copy from the first copy of the current version of the record stored in the second database, the first copy of the current version of the record stored in the second database with the updated version of the record stored in the first database;
change an end time period of validity for the second copy of the current version of the record stored in the second database to the update time of the updated version of the record stored in the first database; and
assign a start time period of validity for the updated version of the first copy of the record stored in the second database equal to the update time of the updated version of the record stored in the first database.

8. The computer program product according to claim 7, wherein the period of validity reflects a period of time when a particular version of the record was valid.

9. The computer program product according to claim 7, further comprising instructions to:
transfer, in response to a retrieval request for data stored in the first database for the record in association with a designated point in time, the retrieval request to the second device.

10. The computer program product according to claim 9, wherein the retrieval request for data stored in the first database for the record in association with the designated point in time is transferred to the second device after any updates of the record stored in the first database performed before the designated point in time are reflected onto the second database.

11. The computer program product according to claim 7, further comprising instructions to:
transfer, in response to a retrieval request for data stored in the first database for the record at a present point in time, the retrieval request for the data with the present point in time to the second device.

12. The computer program product according to claim 7, wherein the second device is a device capable of retrieving data stored in the second database faster than the first device retrieving data stored in the first database.

13. A method of managing data stored on a first device having a first database that only stores current versions of records and a second device having a second database that stores copies of current and prior versions of records stored in the first database, the method comprising:
updating, at an update time, data stored in the first database for a record, wherein the updating includes replacing a current version of the record with an updated version of the record; and
asynchronously updating a first copy of the current version of the record stored in the second database with the updated version of the record stored in the first database, wherein asynchronously updating the first copy of the current version the record stored in the second database with the updated version of the record stored in the first database further comprises:
generating a second copy from the first copy of the current version of the record stored in the second database to be stored in the second database, prior to updating the first copy of the current version of the record stored in the second database with the updated version of the record stored in the first database;
updating, in response to generating the second copy from the first copy of the current version of the record stored in the second database, the first copy of the current version of the record stored in the second database with the updated version of the record stored in the first database;
changing an end time period of validity for the second copy of the current version of the record stored in the second database to the update time of the updated version of the record stored in the first database; and
assigning a start time period of validity for the updated version of the first copy of the record stored in the second database equal to the update time for the updated version of the record stored in the first database.

14. The method according to claim 13, wherein the second device is a device capable of retrieving data stored in the second database faster than the first device retrieving data stored in the first database.

15. The method according to claim 14, further comprising:
   transferring, in response to a retrieval request for data stored in the first database for the record in association with a designated point in time, the retrieval request to the second device.

16. The method according to claim 13, wherein the period of validity reflects a period of time when a particular version of the record was valid.

17. The method according to claim 13, further comprising:
   transferring, in response to a retrieval request for data stored in the first database for the record in association with a designated point in time, the retrieval request to the second device.

18. The method according to claim 17, wherein the retrieval request for data stored in the first database for the record in association with the designated point in time is transferred to the second device after any updates of the record stored in the first database performed before the designated point in time are reflected onto the second database.

19. The method according to claim 9, further comprising:
   transferring, in response to a retrieval request for data stored in the first database for the record at a present point in time, the retrieval request for the data to the second device.

20. The method according to claim 13, wherein the second device is a device capable of retrieving data stored in the second database faster than the first device retrieving data stored in the first database.

* * * * *